(12) United States Patent
Gerszberg et al.

(10) Patent No.: US 6,222,520 B1
(45) Date of Patent: Apr. 24, 2001

(54) INFORMATION DISPLAY FOR A VISUAL COMMUNICATION DEVICE

(75) Inventors: Irwin Gerszberg, Kendall Park; Jeffrey S. Martin, Dover; Hopeton S. Walker, Haledon, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/001,906

(22) Filed: Dec. 31, 1997

(51) Int. Cl.$^7$ .............................. G09G 5/00; H04N 7/14
(52) U.S. Cl. ............................ 345/113; 345/115; 348/14
(58) Field of Search ................................ 345/342, 334, 345/113, 155, 202, 428, 344, 435, 501, 115; 364/408; 348/13, 14, 20

(56) References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,916,441 | 4/1990 | Gombrich . |
| 5,014,267 | 5/1991 | Tompkins et al. . |
| 5,025,373 * | 6/1991 | Keyser et al. .................. 364/408 |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,619,684 | 4/1997 | Goodwin et al. . |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |
| 5,880,728 * | 1/2000 | Yamaashi et al. ................ 345/343 |
| 5,903,265 * | 5/1999 | Bogdan ............................. 345/334 |
| 6,014,137 * | 1/2000 | Burns ............................... 345/334 |
| 6,020,916 * | 2/2000 | Gerszberg et al. ................ 348/15 |

* cited by examiner

Primary Examiner—Jeffery Brier
Assistant Examiner—Chantè E. Harrison

(57) ABSTRACT

A screen interface for a communication device is provided. The screen interface includes a screen for displaying information. A control circuit controls the displaying of information. The control circuit controls the screen to have a first display mode in which the screen includes a first display section surrounding a second independently controllable display section.

26 Claims, 12 Drawing Sheets

INFORMATION DISPLAY FOR A VISUAL COMMUNICATION DEVICE

FIELD OF THE INVENTION

The present invention generally relates to a visual communication device and, more particularly, to an information display for a visual communication device.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as ETHERNET transported over digital subscriber line (DSL) modems. ETHERNET is a registered trademark of Xerox Corporation. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs and/or desired Quality levels. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. An integral part of developing such new services is providing a customer with devices and interfaces to permit easy access to and utilization of the services. In addition, these devices must be provided to customers at an affordable cost.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a videophone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

The video phone integrates a plurality of devices used to access multiple telephoning services. The device utilizes intelligent control circuitry that integrates several service access devices into one unit that has a user-friendly interface and flexible connectivity to the telephone network. The video phone creates an advantage by offering a flexible platform which gives the user the ability to place and receive phone calls while offering services that are advanced compared with traditional telephoning. Some of these services include: voice calls, video calls, voice recognition, bill paying, Internet access, advertising, e-mail, voicemail, videomail, operator services, debit card transactions, and alarm monitoring. The present invention provides systems and methods of displaying information to a customer using the videophone. In a particular implementation, the information displayed to the customer is advertising. Using revenues derived from the advertisers whose advertising is displayed to the customers, interexchange companies can offer videophones to their customers at a reduced cost.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
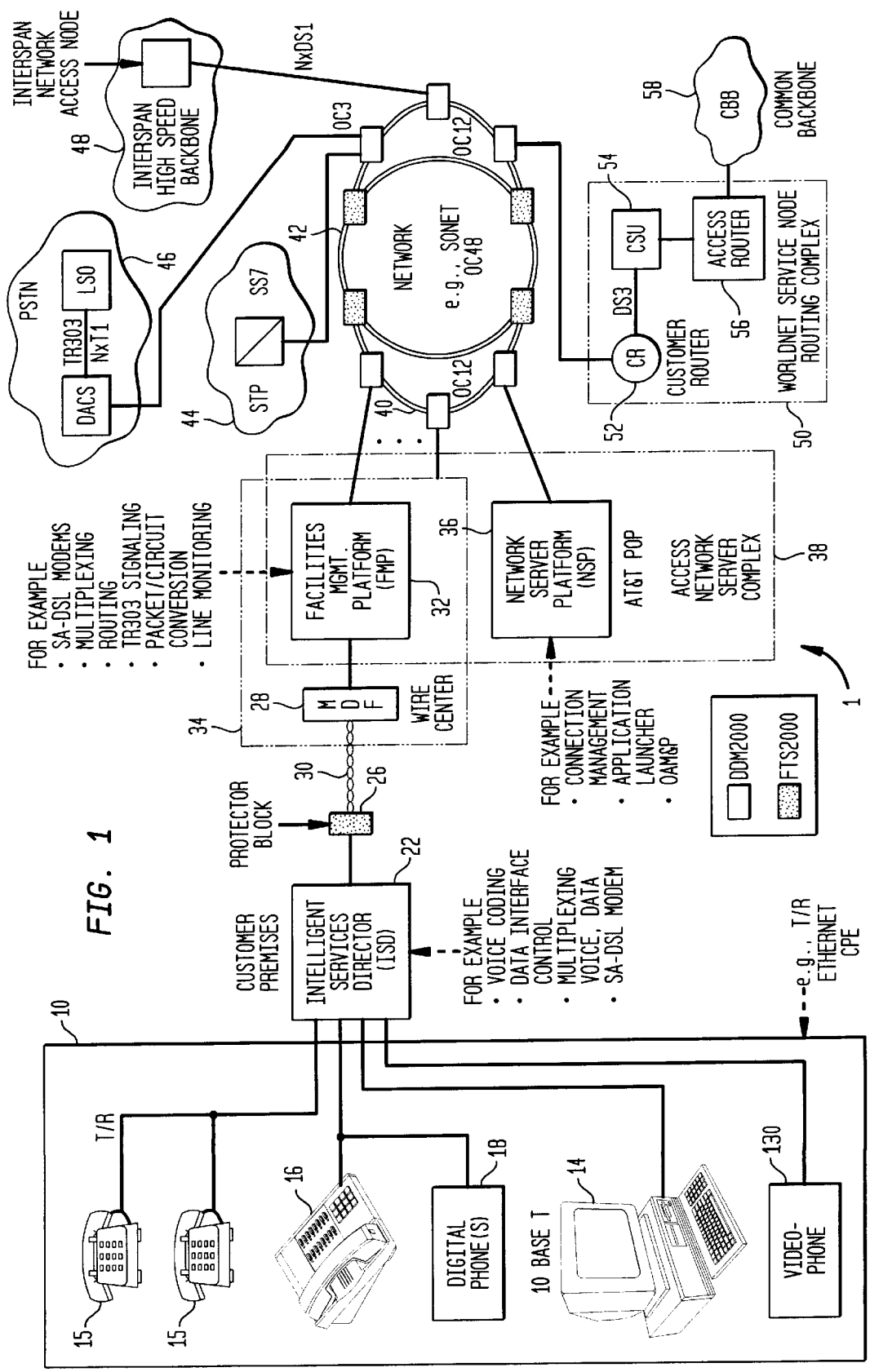
FIG. 1 illustrates an embodiment of a hybrid fiber twisted pair local loop network architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a protector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network, The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network) 44, common backbone 58 via node routing complex 50 (e.g., AT&T Worldnet Service Node Routing Complex including customer router 52, channel service unit 54 and access router 56) and/or a network server platform (NSP) 36. Alternatively, the FMP 32 may be directly connected to any of these networks. One or more FWPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET network 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply reloading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment. Additionally, the service provider may collect fees from advertisers to subsidize the cost of the equipment.

Figure 2:
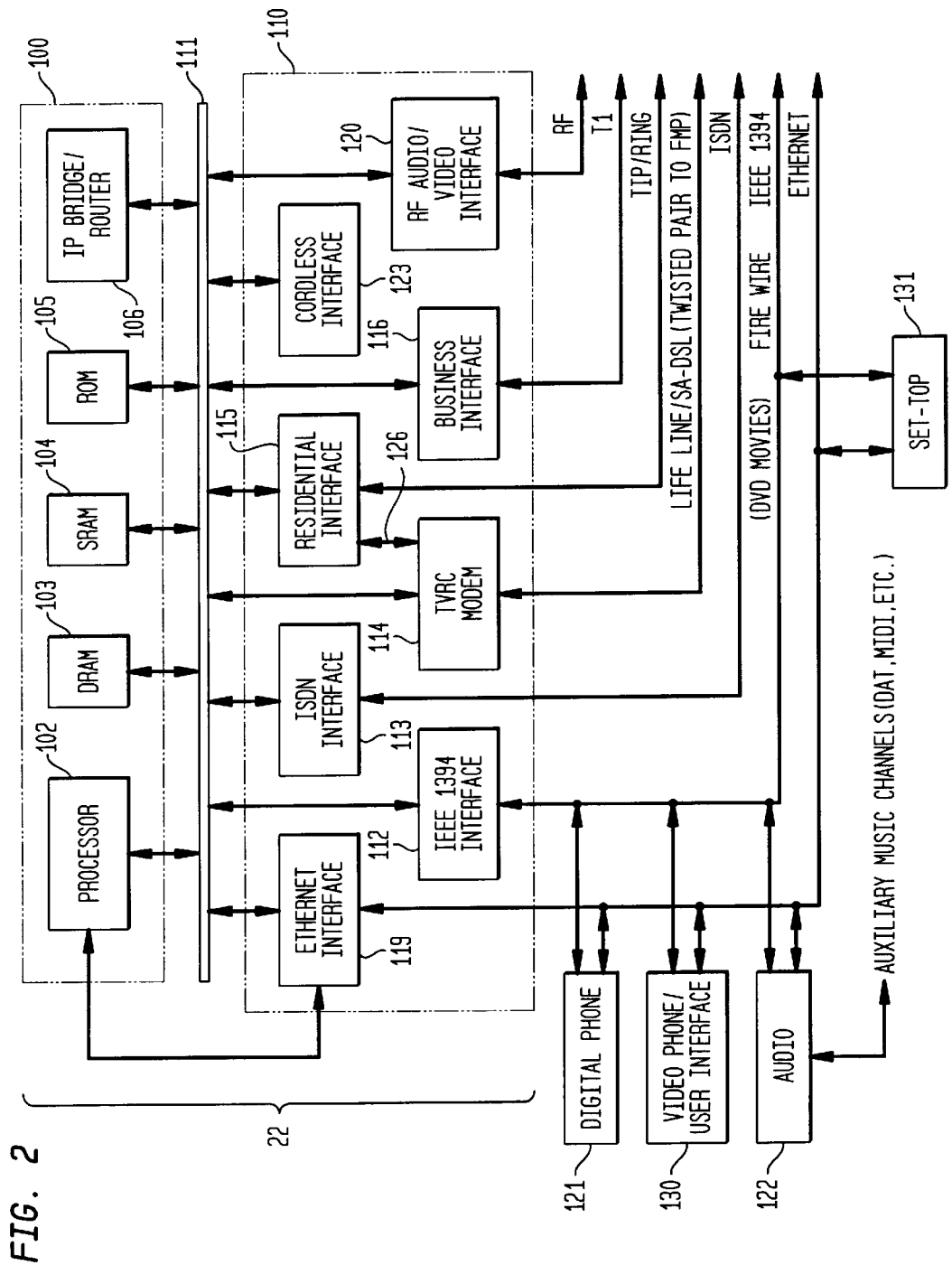
FIG. 2 is a block diagram of an embodiment of an intelligent services director (ISD) consistent with the architecture shown in FIG. 1.

Referring to FIG. 2, the ISD 22 may connect with a variety of devices including analog and digital voice telephones 15, 18; digital videophones 130, devices for monitoring home security (not shown), meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires fiber and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an ETHERNET interface 119 (for example, 28.8 kbps data, 56 kbps data, or ISDN or any other suitable bit rate service), an IEEE 1394 "fire wire" interface 112 (e.g., for a digital videodisc device (DVD)), a digital subscriber line (DSL) modem (e.g., a TVRC modem interface 114), a residential interface 115 (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the ETHERNET interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol/Internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
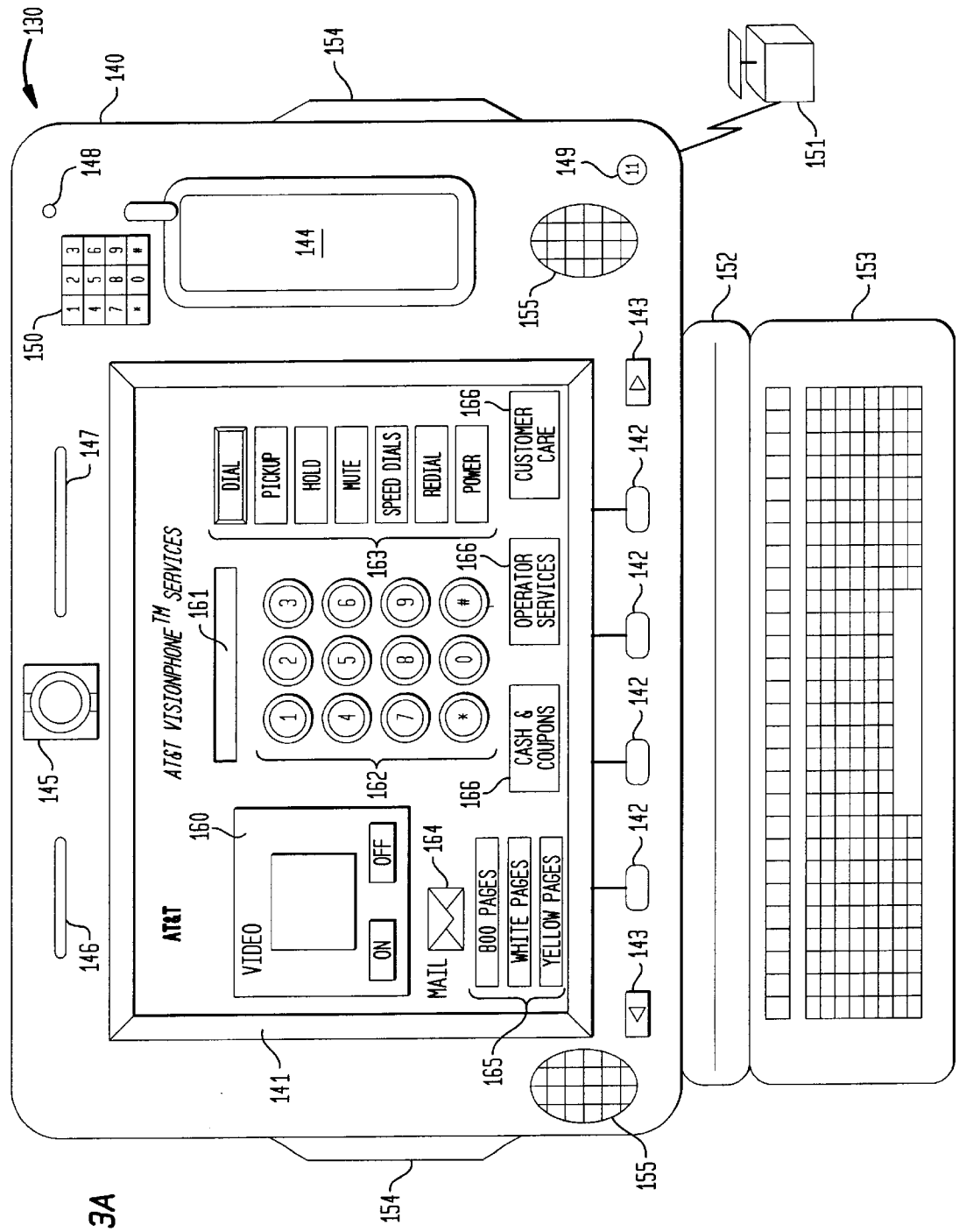
FIGS. 3A and 3B illustrate an embodiment of a videophone consistent with the architecture shown in FIG. 1.
Figure 3B:
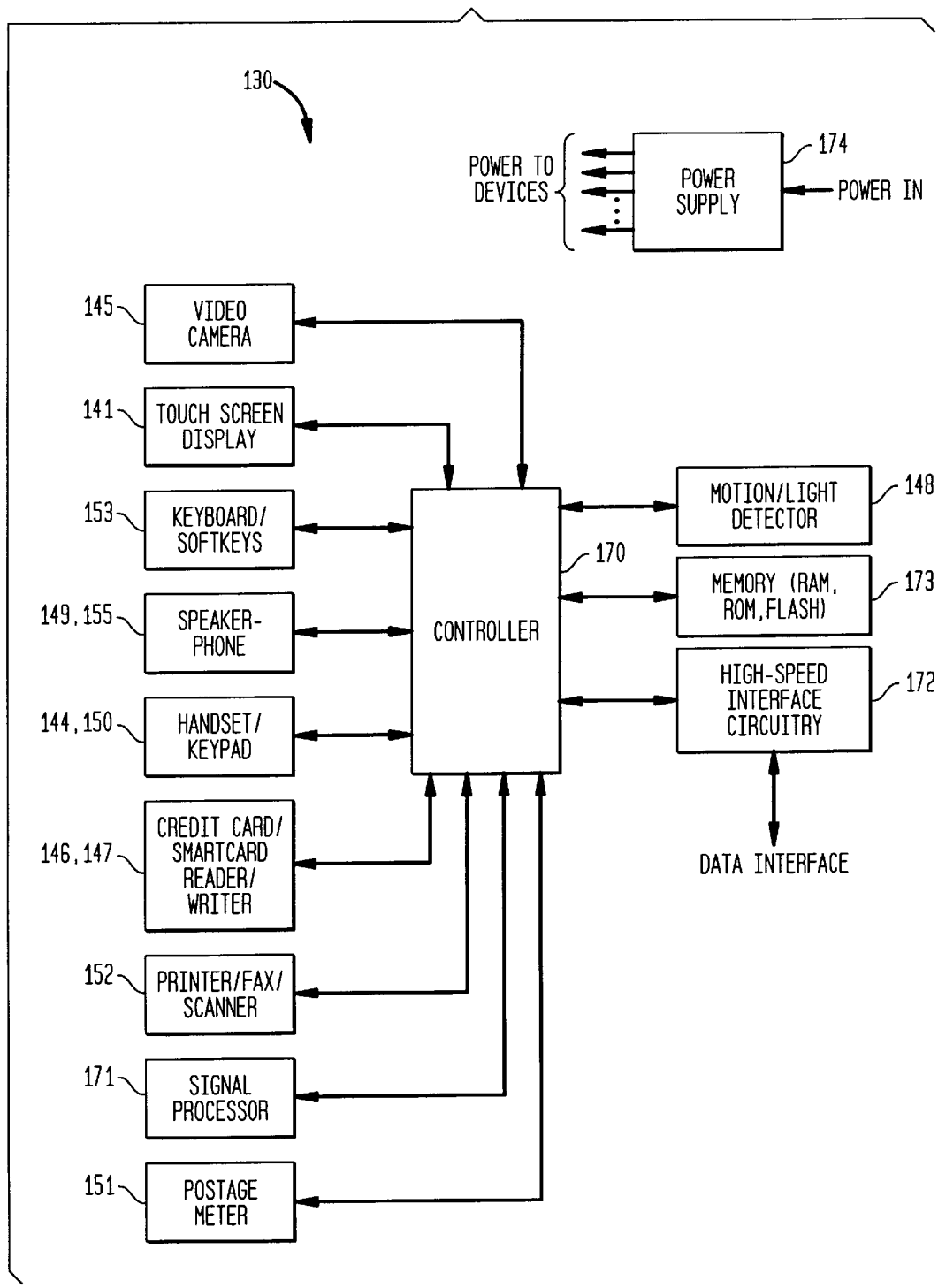

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. A mouse, trackball, touchpad, etc. may also be provided as input devices, e.g., to interact with the user interface. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170. Among other functions, controller 170 serves to format the audio and video from the microphone and camera of videophone 130 in a suitable data format such as H.323.

When the videophone 130 is used as a video telephone, the display 141 may include one or more video window(s) 160 for viewing a person to whom a customer is speaking and/or showing the picture seen by the person on the other end of the video phone. The display may also include a display window 161 for displaying the identifier, phone number, IP address, etc. of a called (or addressed) party, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
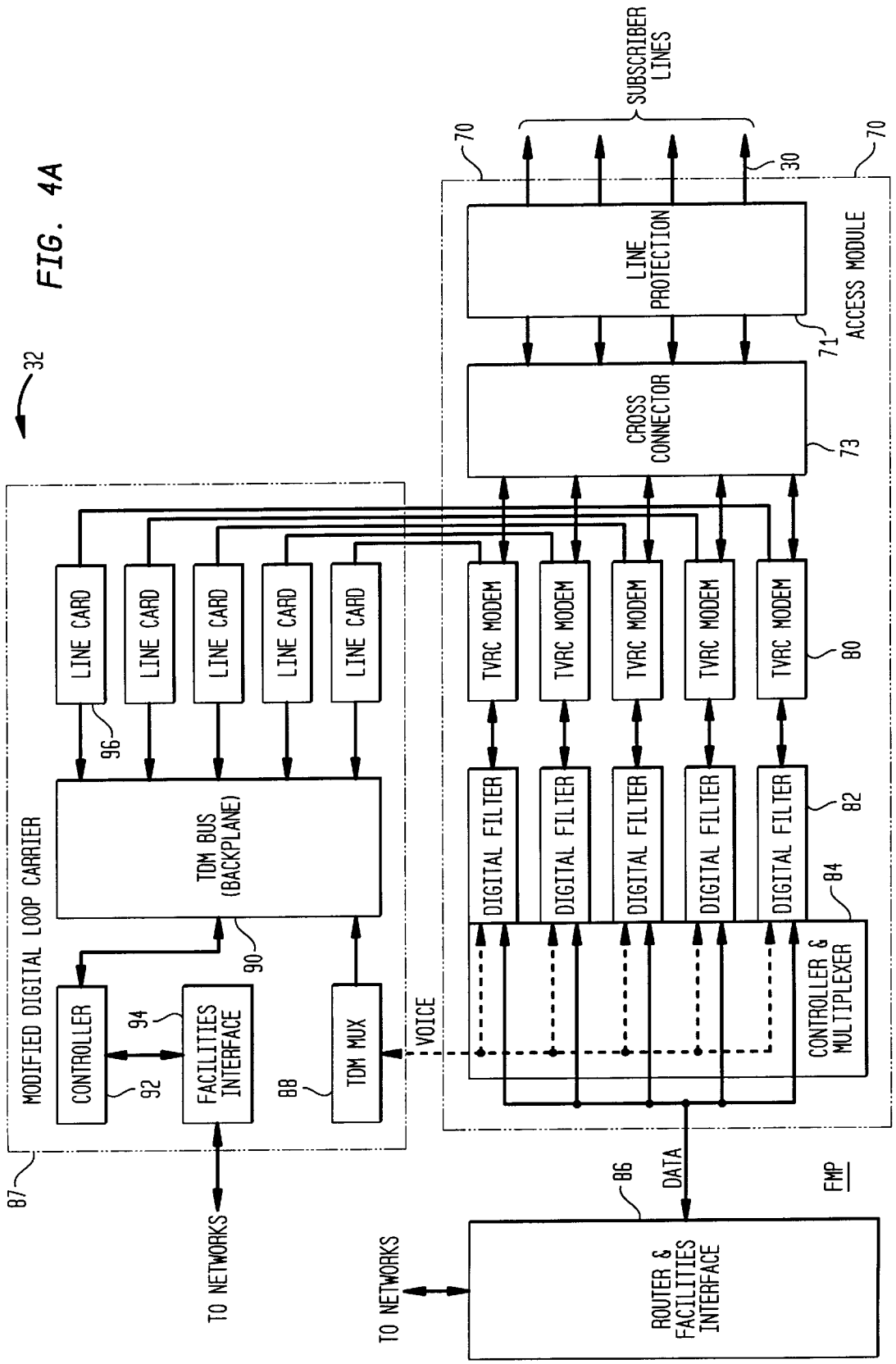
FIG. 4A is a block diagram of an embodiment of a facilities management platform (FMP) consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
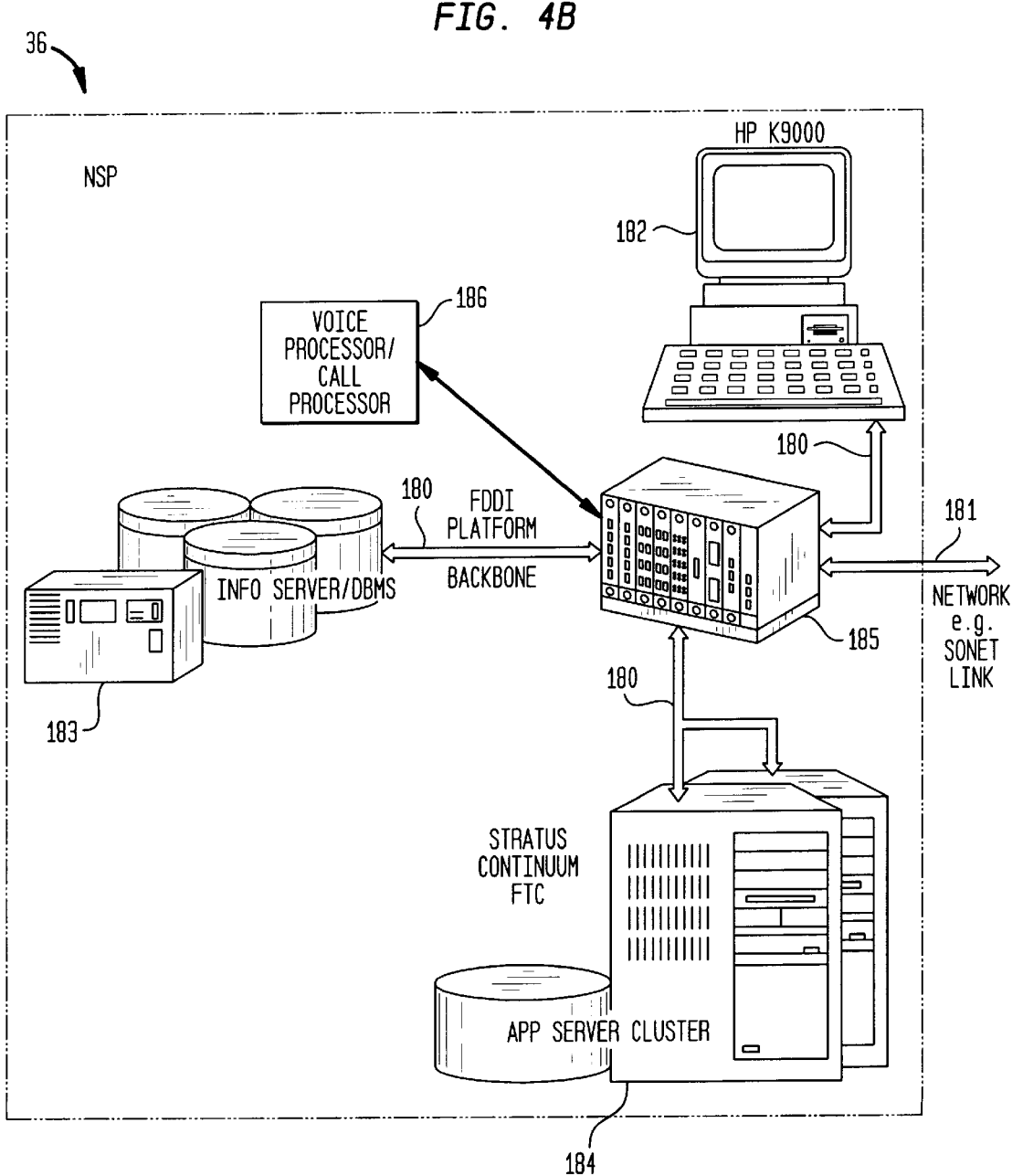
FIG. 4B illustrates a block diagram of an embodiment of a network server platform (NSP) consistent with the architecture shown in FIG. 1.

Referring to FIG. 4B, the NSP 36 may be variously configured to provide any number of services provided by a server such as information services, Internet services, pay-per-view movie services, data-base services, commercial and advertising services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Figure 5:
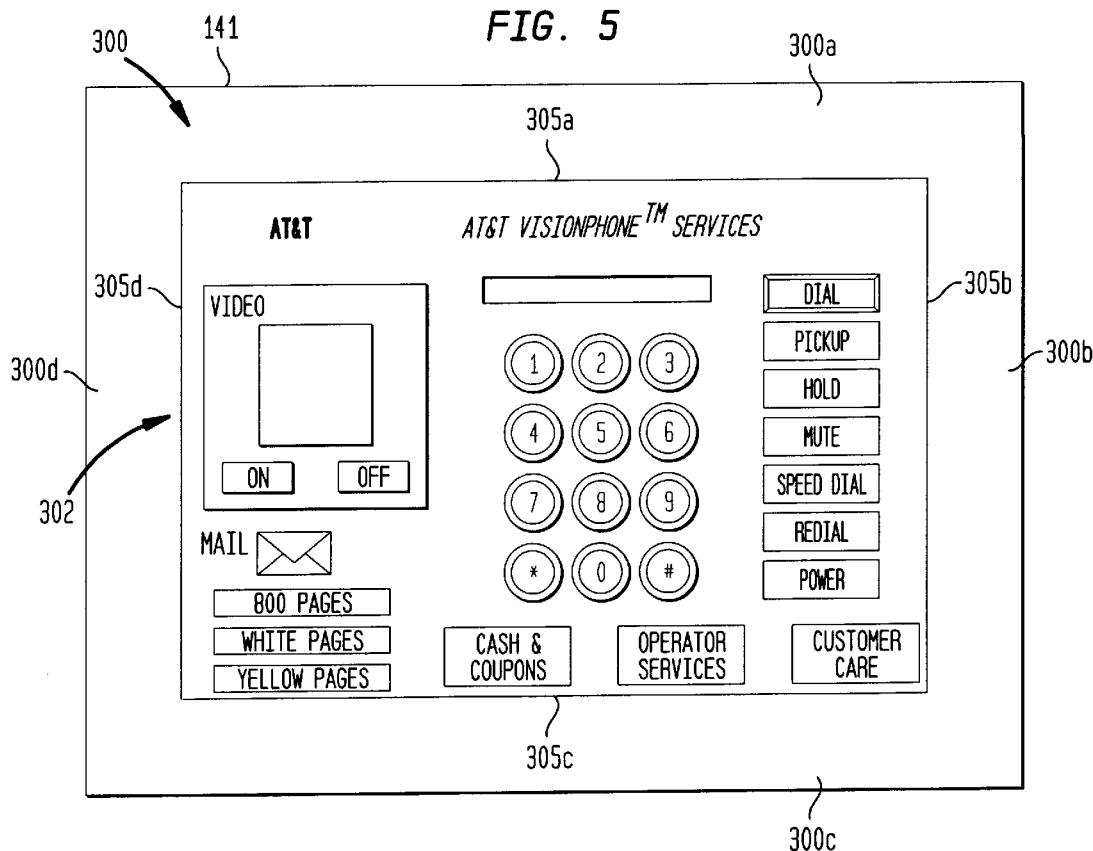
FIG. 5 illustrates an information display having first and second display sections in accordance with the present invention.

When screen 141 of videophone 130 is an inactive state, a full-screen display of, for example, advertising is presented as described in U.S. application Ser. No. 09/001,574, filed Dec. 31, 1997, entitled "Advertising Screen Saver", filed concurrently herewith. When screen 141 is placed in an active state by, for example, touching the screen, the display on the screen is changed to include a first display section and a second display section. With reference to FIG. 5, a first display section 300 includes portions 300a, 300b, 300c, and 300d which form a border or frame around second display section 302. Second display section 302 constitutes the main display section and displays, for example, the user interface shown in FIG. 3A for accessing various services and further described in U.S. application Ser. No. 09/001,905, filed Dec. 31, 1997, entitled "The VideoPhone" and filed concurrently herewith, and/or displays data from a data service requested by the subscriber (e.g., a television program, stock quotations, sports scores, etc.). First display section 300 displays other data such as advertising which may be related or unrelated to what is being displayed on second display section 302. The data displayed in first display section may include text, graphics, and/or animations, as well as buttons or icons which solicit customer input. Thus, for example, icons or buttons of the different video and audio channels available for viewing and listening may be arranged in first display section 300 to permit the customer to easily and quickly change channels.

Figure 6A:
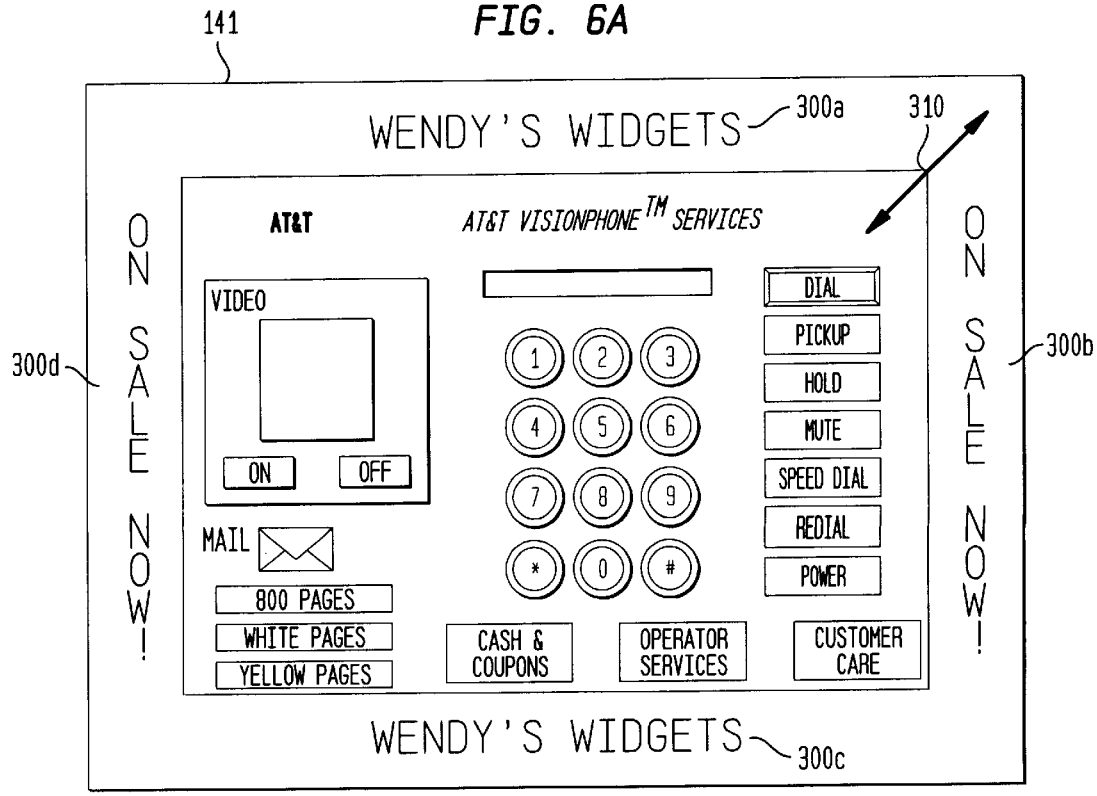
FIG. 6A illustrates an information display in accordance with the present invention in which advertising is displayed in the first display section and a user interface is displayed in the second display section.
Figure 6B:
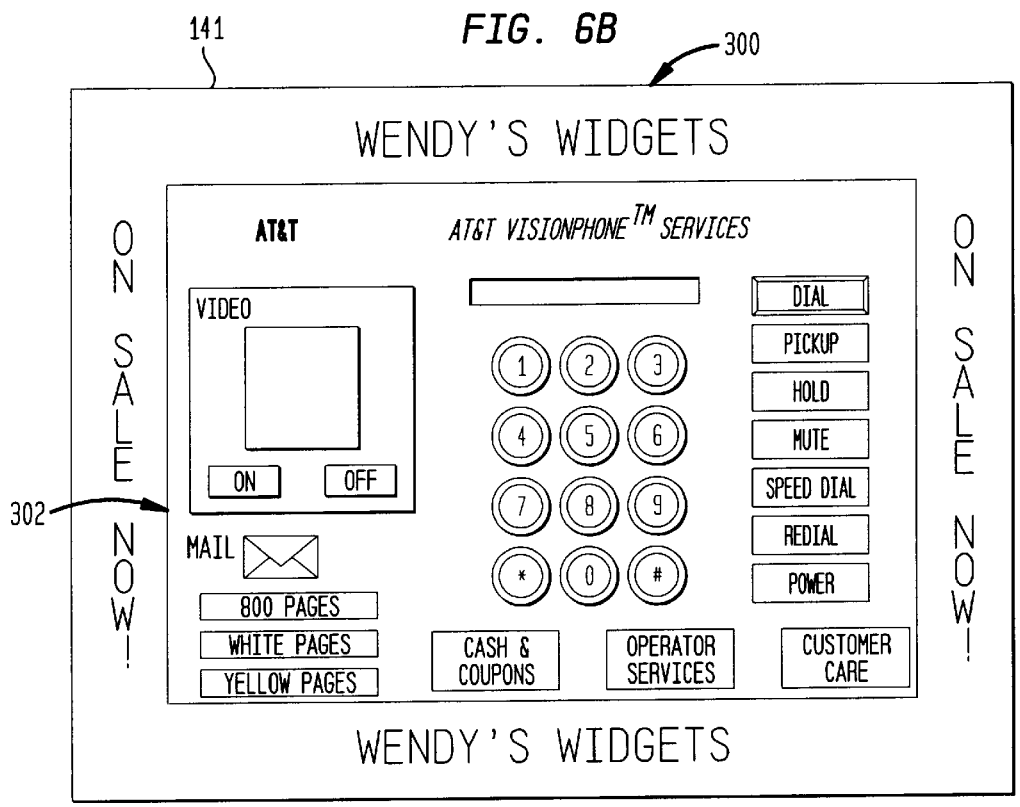
FIG. 6B illustrates an information display in which the first display section is grown with respect to the first display section of FIG. 6A.
Figure 6C:
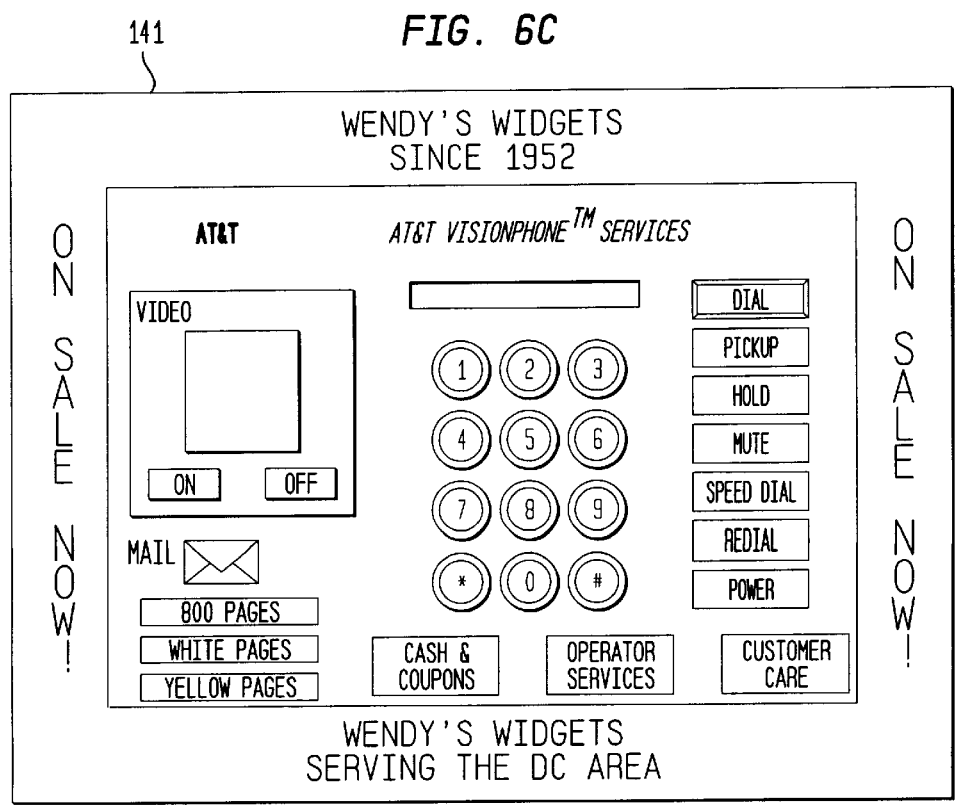
FIG. 6C illustrates an information display in which additional information is displayed when the first display section is grown.

The size of the first display section 300 should be sufficient to permit the effective communication of data such as advertising to the subscriber. However, it is generally desirable that the size of first display section 300 should not adversely impact on the viewability of data (i.e., menus, video, etc.) displayed in second display section 302. Bearing these considerations in mind, the particular dimensions of the first display section 300 are not critical to the present invention. Preferably, the size of first display section 300 is at least partly configurable by the user. For example, by dragging at a corner 310 between two adjacent border portions as suggested in FIG. 6A, the portions 300a–300d of first display section may be grown or shrunk. FIG. 6B shows the case in which the portions 300a–300d are grown relative to FIG. 6A. In these cases of growth or shrinkage, the size of the data displayed in display portions 300a–300d may be increased, decreased, or remain the same. For example, the size of the alphanumeric characters comprising the text in display section 300 is increased in FIG. 6B relative to FIG. 6A. Similarly, when first display section 300 is shrunk, the size of the data displayed in first display section 300 may be decreased. In an alternative implementation, the growing or shrinking of the first display section 300 results in the display of more or less data. That is, when first display section 300 is grown, data is added to first display section 300. For example, in the case of text, lines of text may be added as can be seen by comparing the display of FIG. 6C to the display of FIG. 6A. Similarly, when display section 300 is shrunk, data may be removed from first display section 300.

While portions 300a, 300b, 300c, and 300d are shown in FIG. 5 as having the same thickness, the invention is not limited in this respect. For example, border portion 300c may have a thickness greater than the thickness of the other border portions so as to accommodate more lines of text, larger graphics and animations, and the like. If desired, display sections 300a–300d may be separately grown or shrunk. For example, by dragging one of the boundaries 305a–305d (see FIG. 5) between the respective display portions 300a–300d and the second display section 302, the thickness of that particular display portion may be grown or shrunk.

Preferably, there are limitations on the degree to which first display section 300 may be grown or shrunk. That is, the customer is not permitted to shrink the border to be smaller than some predetermined border size. In this way, advertising or other information can be continuously displayed to the viewer, even while the customer is actively using some other feature of videophone 130, e.g., a video call, watching a movie, etc. By continuously providing advertising while the customer is actively using some other feature, advertising revenue to the interexchange operators can be increased, thereby permitting the interexchange operator to provide the videophone to customers at a subsidized price or even for free. Alternatively, upon payment to the interchange operator, a suitable applet may be provided to videophone 130 to permit the customer to shrink first display region 300 so as to eliminate the border, if desired.

Figure 7:
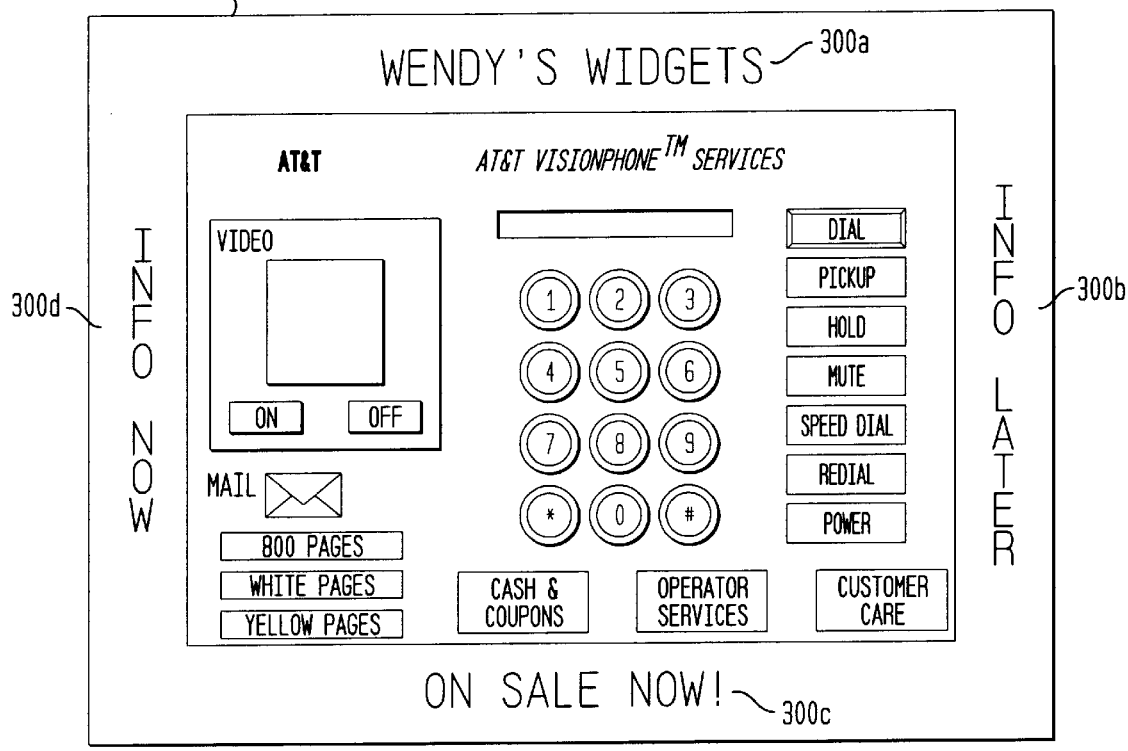
FIG. 7 illustrates an example of an information display in accordance with the present invention.
Figure 8A:
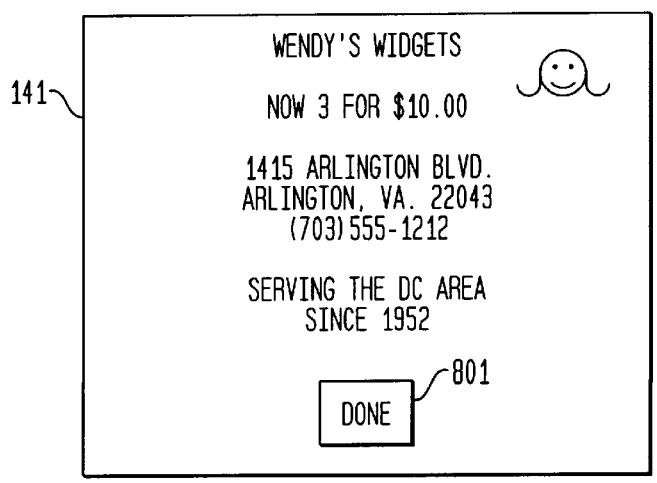
FIG. 8A illustrates a full-screen display which may be provided when a customer touches display portion 300d of FIG. 7.
Figure 8B:
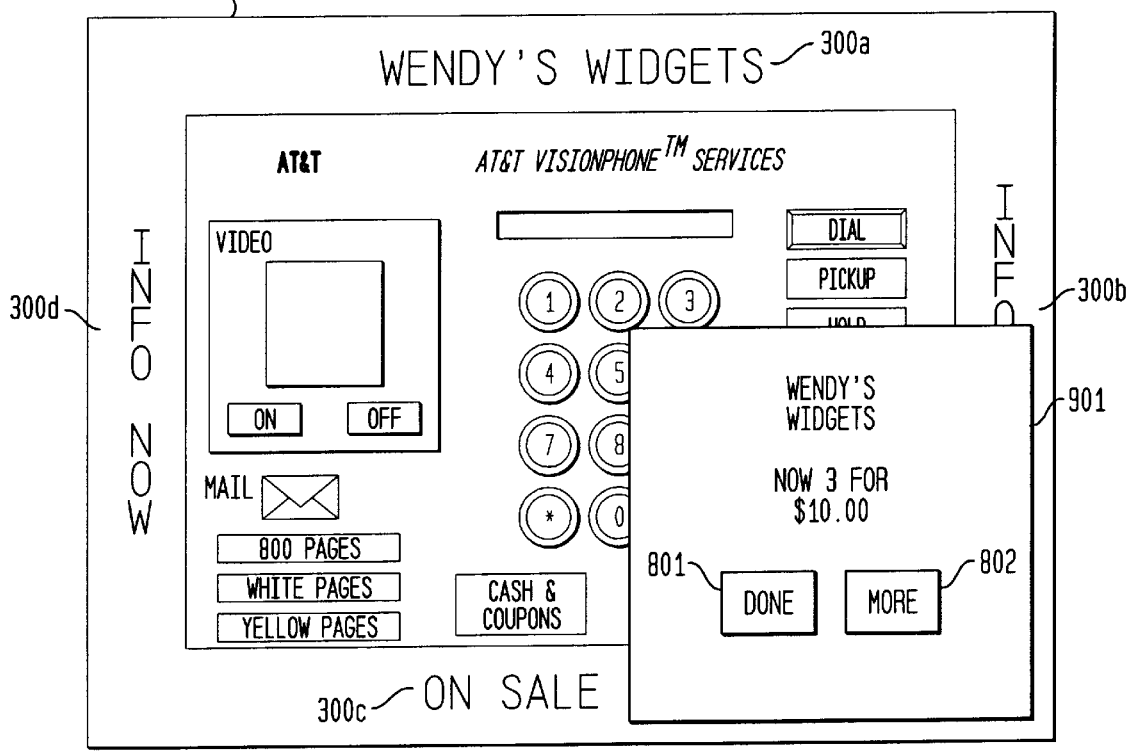
FIG. 8B illustrate a pop-up window which may be provided when a customer touches display portion 300d of FIG. 7.

It will be apparent that there are an almost unlimited number of ways in which first display portion 300 may be utilized to communicate data such as advertising to the customer. While this invention is not limited to any particular one of these ways, several illustrative, but non-limiting, examples will now be described. In FIG. 7, the top and bottom display portions 300a and 300c contain information about the company and/or product being advertised. Display portion 300d provides a prompt which, when touched, immediately provides additional information regarding the product and/or company being advertised. This additional data may be presented as a full-screen window such as the window shown in FIG. 8A, which window may be closed by pressing "Done" button 801 or some other suitable prompt. Alternatively, a more limited display of the additional data may be presented using a pop-up window 901 as shown in FIG. 8B. The alignment of pop-up window 901 (e.g., centered, upper left corner, lower right corner, etc.) is not critical. If desired, the customer can be provided with the capability of dragging pop-up window 901 to a desired display position. As with the full-screen window of FIG. 8A, the pop-up window of FIG. 8B may include a "Done" button or some other suitable prompt for closing the window. In addition, pop-up window 901 may include a "More" button or some other suitable prompt which may be touched to provide additional information (e.g., address, phone, store hours, etc.) by changing the text and/or graphics displayed in pop-up window 901. The full-screen window of FIG. 8A may also be provided with a "More" button or some other suitable prompt for accessing additional information.

Display portion 300b of FIG. 7 may be touched to store information regarding the product and/or company being advertised for viewing at a later time. This information may be stored in memory 173 of videophone 130 or may, for example, be e-mailed to the customer. The user interface may be configured to permit the customer to access this stored information.

Figure 9:
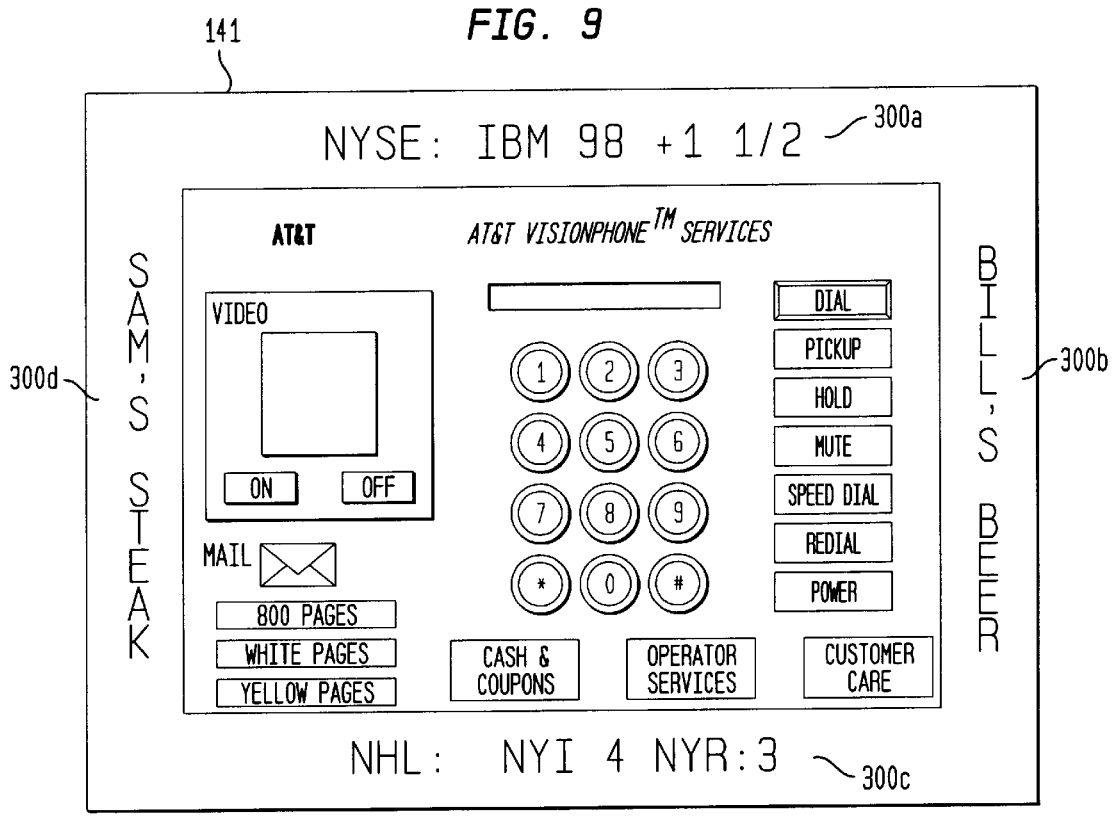
FIG. 9 illustrates another example of an information display in accordance with the present invention.

Referring to FIG. 9, each of the display portions 300a–300d respectively displays unrelated information. For example, display portion 300a may display stock information while display portion 300c may display sports score information. Display portions 300b and 300d may display advertising.

The information displayed in display portions 300a–300d in the above embodiments may be displayed for a predetermined period of time (e.g., 20 seconds) and then changed. Alternatively, one or more of these display portions may display information which scrolls in a particular direction, e.g., from left to right; from right to left; up and down; or any combination thereof. Of course, it will be appreciated that the system should be configured to present the information in first display section 300 in a manner which is not overly distracting or irritating to a customer who is watching a movie or otherwise focusing his/her attention on the display of the second display portion 302.

Figure 10:
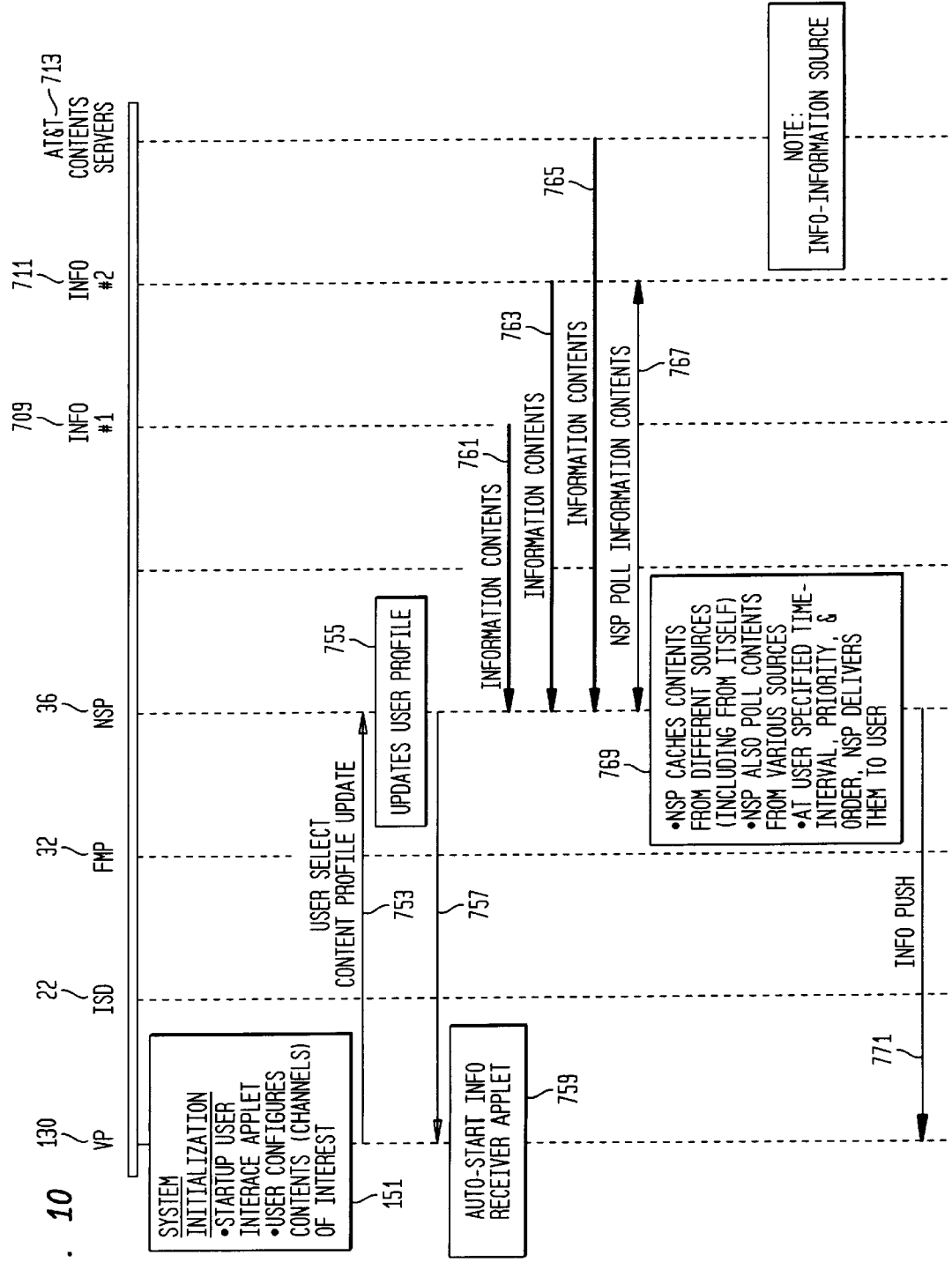
FIG. 10 illustrates an exemplary process by which information for the information display of the present invention is collected.

FIG. 10 shows an illustrative, but non-limiting, example of service connectivity by an NSP to provide the data which is shown to customer in first display section 300. In the method shown in FIG. 10, the data shown to the customer is based on a customer profile generated at startup showing his/her interests and preferences. This profile may be generated by the customer based on an identification of interests and preferences in response to various prompts via screen 141 of videophone 130. The profile may also be generated by NSP 36 based on an analysis of customer habits (such as which services the customer frequently accesses) and of demographic data based on where the customer lives, the customer's occupation, etc. Such analysis may also be used by NSP 36 to modify or update a customer-created profile. NSP 36 comprises significant cache memory and can search for and collect information directly related to the customer profiles. When screen 141 is in the active state, some or all of the information that NSP 36 has collected for the customer is forwarded (or "pushed") to screen 141 of videophone 130.

With reference to FIG. 10, components of the system and service architecture are shown at the top including videophone 130, intelligent services director (ISD) 22, facilities management platform (FMP) 32 and network server platform (NSP) 36. Info #1 709 and Info #2 711 are shown by way of example as one or more information service providers that the NSP 36 may access for information. Finally, by way of example, AT&T information content servers as a group are shown as AT&T Content Servers 713.

At step 751, videophone 130 performs system/service initialization. As mentioned above, there is a startup via a user interface applet which may be accessed, for example, by touching a customer profile icon. Then, the customer is presented with a user profile display or other input means for inputting information contents of interest to the customer. The contents ultimately may refer to channels whereby the information can be obtained, for example, stock market ticker, sports ticker channels, advertisements, product descriptions, etc.

At step 753, the customer profile for selected contents (information channels) is transmitted via ISD 22 and FMP 32 for storage at NSP 36. NSP 36 then either updates any previous user profile in memory or initializes the user profile in memory at step 755. NSP 36 then, once the customer profile is known, can begin to search for relevant information at any and all information sources available on SONET ring network 42 (FIG. 1). An information receiver applet is provided to videophone 130 (step 757) and when screen 141 is in the active state, the applet is executed (step 759) and the information collected by NSP 36 is pushed to videophone 130 at step 771.

Prior to pushing the information to videophone 130 at step 771, NSP 36 collects information from various sources at steps 761, 763 and 765. The access to the information source may be via private line, shared line, Internet or telephony channels. For example, at step 761 the information contents of Info #1 709 relevant to the customer profile is downloaded and stored in cache memory of NSP 36 for subsequent pushing to videophone 130. At step 763, the information contents of Info #2 711 relevant to the customer profile is downloaded and stored in cache memory of NSP 36. Only two information sources are shown but many information sources may be queried and the query results downloaded to NSP 36. Finally, via AT&T or other Internet service provider, the respective information content servers may be queried for relevant information and provided to NSP 36. These may include stock market tickers, sports tickers, news tickers, advertisements and the like of current interest. At either NSP 36 or videophone 130, information filters may be used to only retrieve current data with respect to, for example, the stock portfolio or sports teams of interest to the user. Moreover, NSP 36 periodically updates the cache memory with newly received information relevant to the customer's profile. A new information source may appear on the Internet or as a telephone listing or a new sports or other channel may be identified to NSP 36 for polling. This is shown as step 767.

In summary, then as shown at step 769, NSP 36 caches contents from different sources (including from itself—for example—local directory listings and geographical location finding services). The NSP also polls contents from various sources to, for example, obtain updates or new information. When the screen is in an active state, the collected information is ordered and delivered to the customer user via an information push at step 771. As noted above, the pushed information may be displayed for a predetermined period of time in the various display portions and then changed or the information may be scrolled in one or more of the display portions.

The following applications, filed concurrently herewith, are hereby incorporated by reference:

1. A Hybrid Fiber Twisted-pair Local Loop Network Service Architecture (U.S. application Ser. No. 09/001,360, filed Dec. 31, 1997);
2. Dynamic Bandwidth Allocation for use in the Hybrid Fiber Twisted-pair Local Loop Network Service Architecture (U.S. application Ser. No. 09/001,425, filed Dec. 31, 1997);
3. The VideoPhone (U.S. application Ser. No. 09/001,905, filed Dec. 31, 1997);
4. Video Phone Privacy Activator (U.S. application Ser. No. 09/001,909, filed Dec. 31, 1997);
5. VideoPhone Form Factor (U.S. application Ser. No. 09/001,583, filed Dec. 31, 1997);
6. VideoPhone Centrally Controlled User Interface With User Selectable Options (U.S. application Ser. No. 09/001,576, filed Dec. 31, 1997);
7. VideoPhone User Interface Having Multiple Menu Hierarchies (U.S. application Ser. No. 09/001,908, filed Dec. 31, 1997);
8. VideoPhone Blocker (U.S. application Ser. No. 09/001,353, filed Dec. 31, 1997);
9. VideoPhone Inter-com For Extension Phones (U.S. application Ser. No. 09/001,358, filed Dec. 31, 1997);
10. Advertising Screen Saver (U.S. application Ser. No. 09/001,574, filed Dec. 31, 1997);
11. Information Display for a Visual Communication Device (U.S. application Ser. No. 09/001,906, filed Dec. 31, 1997);
12. VideoPhone Multimedia Announcement Answering Machine (U.S. application Ser. No. 09/001,911, filed Dec. 31, 1997);
13. VideoPhone Multimedia Announcement Message Toolkit (U.S. application Ser. No. 09/001,345, filed Dec. 31, 1997);
14. VideoPhone Multimedia Video Message Reception (U.S. application Ser. No. 09/001,362, filed Dec. 31, 1997);
15. VideoPhone Multimedia Interactive Corporate Menu Answering Machine Announcement (U.S. application Ser. No. 09/001,575, filed Dec. 31, 1997);
16. VideoPhone Multimedia Interactive On-Hold Information Menus (U.S. application Ser. No. 09/001,356, filed Dec. 31, 1997);
17. VideoPhone Advertisement When Calling Video Non-enabled VideoPhone Users (U.S. application Ser. No. 09/001,361, filed Dec. 31, 1997);
18. Motion Detection Advertising (U.S. application Ser. No. 09/001,355, filed Dec. 31, 1997);
19. Interactive Commercials (U.S. application Ser. No. 09/001,578, filed Dec. 31, 1997);
20. Video Communication Device Providing In-Home Catalog Services (U.S. application Ser. No. 09/001,421, filed Dec. 31, 1997);
21. A Multifunction Interface Facility Connecting Wideband Multiple Access Subscriber Loops With Various Networks (U.S. application Ser. No. 09/001,422, filed Dec. 31, 1997);
22. Life Line Support for Multiple Service Access on Single Twisted-pair (U.S. application Ser. No. 09/001,343, filed Dec. 31, 1997);
23. A Network Server Platform (NSP) For a Hybrid Fiber Twisted-pair (HFTP) Local Loop Network Service Architecture (U.S. application Ser. No. 09/001,582, filed Dec. 31, 1997);
24. A Communication Server Apparatus For Interactive Commercial Service (U.S. application Ser. No. 09/001,344, filed Dec. 31, 1997);
25. NSP Based Multicast Digital Program Delivery Services (U.S. application Ser. No. 09/001,580, filed Dec. 31, 1997);
26. NSP Internet, JAVA Server and VideoPhone Application Server (U.S. application Ser. No. 09/001,354, filed Dec. 31, 1997);
27. NSP WAN Interconnectivity Services for Corporate Telecommuting (U.S. application Ser. No. 09/001,540, filed Dec. 31, 1997);
28. NSP Telephone Directory White-Yellow Page Services (U.S. application Ser. No. 09/001,426, filed Dec. 31, 1997);
29. NSP Integrated Billing System For NSP services and Telephone services (U.S. application Ser. No. 09/001,359, filed Dec. 31, 1997);
30. ISD and NSP Caching Server (U.S. application Ser. No. 09/001,419, filed Dec. 31, 1997);
31. An Integrated Services Director (ISD) For Overall Architecture (U.S. application Ser. No. 09/001,417, filed Dec. 31, 1997);
32. ISD/Video Phone (Customer Premises) Local House Network Network (U.S. application Ser. No. 09/001,418, filed Dec. 31, 1997);

33. ISD Wireless Network (U.S. application Ser. No. 09/001,363, filed Dec. 31, 1997);
34. ISD Controlled Set-Top Box (U.S. application Ser. No. 09/001,424, filed Dec. 31, 1997);
35. Integrated Remote Control and Phone (U.S. application Ser. No. 09/001,423, filed Dec. 31, 1997);
36. Integrated Remote Control and Phone User Interface (U.S. application Ser. No. 09/001,420, filed Dec. 31, 1997);
37. Integrated Remote Control and Phone Form Factor (U.S. application Ser. No. 09/001,910, filed Dec. 31, 1997);
38. VideoPhone Mail Machine (Provisional Application No. 60/070,104, filed Dec. 31, 1997) ;
39. Restaurant Ordering Via VideoPhone (Provisional Application No. 60/070,121, filed Dec. 31, 1997);
40. Ticket Ordering Via VideoPhone (Provisional Application No. 60/070,103, filed Dec. 31, 1997);
41. Multi-Channel Parallel/Serial Concatenated Convolutional Codes And Trellis Coded Modulation Encode/Decoder (U.S. application Ser. No. 09/001,342, filed Dec. 31, 1997);
42. Spread Spectrum Bit Allocation Algorithm (U.S. application Ser. No. 09/001,842, filed Dec. 31, 1997);
43. Digital Channelizer With Arbitrary Output Frequency (U.S. application Ser. No. 09/001,581, filed Dec. 31, 1997);
44. Method And Apparatus For Allocating Data Via Discrete Multiple Tones (U.S. application Ser. No. 08/997,167, filed Dec. 31, 1997);
45. Method And Apparatus For Reducing Near-End Cross Talk In Discrete Multi-Tone Modulators/Demodulators (U.S. application Ser. No. 08/997,176, filed Dec. 31, 1997).

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A screen interface for a communication device, comprising a screen for displaying information, and a control circuit for controlling the displaying of information, said control circuit controlling said screen to have a first display mode in which said screen includes a first display section surrounding a second independently controllable display section and wherein information displayed in said first display section is changed periodically and displayed simultaneously with information displayed in the second independently controllable display section.

2. The screen interface according to claim 1, wherein said first display section is resizable in response to certain input information.

3. The screen interface according to claim 2, wherein said first display section is resizable between a minimum size and a maximum size in response to certain input information.

4. The screen interface according to claim 1, wherein said first display section is responsive to certain input information for changing said first display mode to a second display mode.

5. The screen interface according to claim 4, wherein said second display mode is a full-screen display mode.

6. The screen interface according to claim 1, wherein information displayed in said first display section is scrolled.

7. The screen interface according to claim 1, wherein said screen comprises a touch-sensitive screen which simultaneously displays the information and accepts user input information through touch responsive areas on said screen.

8. The screen interface according to claim 3, said control circuit preventing the first display section size from being smaller than a predetermined minimum size.

9. A screen interface for a communication device, comprising a screen for displaying information, and a control circuit for controlling the displaying of information, said control circuit controlling said screen to have a first display mode in which said screen includes a first display section surrounding a second independently controllable display section and wherein information displayed in said first display section is changed periodically, and said first display section is eliminated upon receipt of a predetermined payment.

10. The screen interface according to claim 7, wherein, responsive to a user selection, the information for display in said first display section is sent to the user by electronic mail.

11. A method for displaying information comprising the steps of:
    displaying first and second independently controllable sections of a screen;
    sizing the first section to be larger in size than the second section, said first section surrounding said second section;
    displaying periodically changing information in the first section of said screen simultaneously with information displayed in the second section of the screen;
    displaying information for selection by a user on said screen; and
    receiving said selections from the user through touch responsive areas on said screen.

12. The method of claim 11, furthering comprising the step of:
    limiting the size of the first section of the screen to a predetermined minimum.

13. A method for displaying information comprising the steps of:
    displaying first and second independently controllable sections of a screen;
    sizing the first section to be larger in size than the second section, said first section surrounding said second section;
    displaying periodically changing information in the first section of said screen;
    displaying information for selection by a user on said screen;
    receiving said selections from the user through touch responsive areas on said screen; and
    eliminating the first section of the screen upon receiving a payment of a predetermined fee.

14. The method of claim 11, further comprising the step of:
    displaying scrolling information in the first section of said screen.

15. The screen interface according to claim 1, wherein the first display section completely surrounds the second independently controllable display section.

16. A screen interface for a communication device, comprising a screen for displaying information, and a control circuit for controlling the displaying of information, said control circuit controlling said screen to have a first display mode in which said screen includes a first display section surrounding a second independently controllable display section, and wherein the control circuit accepts user input information from an input device, and the information displayed in the first display section is obtained from a remote site in accordance with the user input information.

17. The screen interface according to claim 16, wherein the user input information is used to build a customer profile and the information obtained from the remote site is in accordance with the customer profile.

18. The screen interface according to claim 16, wherein the user input information is selected from the periodically changed information displayed in the first display section.

19. A method for displaying information comprising the steps of:

displaying first and second independently controllable sections of a screen;

sizing the first section to be larger in size than the second section, said first section surrounding said second section;

displaying periodically changing information in the first section of said screen;

displaying information for selection by a user on said screen;

receiving said selections from the user through touch responsive areas on said screen; and obtaining the information displayed in the first section from a remote site in accordance with the selections from the user.

20. The method of claim 19, wherein the step of obtaining the information comprises a step of receiving by e-mail the information displayed in the first section from a remote site in accordance with the selections from the user.

21. The method of claim 19, wherein the step of obtaining the information displayed in the first section comprises steps of:

building a customer profile based upon the selections from the user; and obtaining the information displayed in the first section from a remote site in accordance with the customer profile.

22. The method of claim 11, wherein the step of sizing the first section comprises a step of sizing the first section to completely surround the second section.

23. The apparatus of claim 1, wherein at least a portion of the first display section is re-sizable.

24. The apparatus of claim 23, wherein when at least a portion of the first display section is re-sized, an amount of the information displayed in the first display section is one of increased and decreased according to a size of the resized first display section.

25. The method of claim 11, further comprising a step of re-sizing at least a portion of the first section of the screen.

26. The method of claim 25, further comprising a step of one of increasing and decreasing an amount of the information displayed in the first section of the screen according to a size of the re-sized first section of the screen.

* * * * *